United States Patent [19]
Morgaine

[11] Patent Number: 5,819,039
[45] Date of Patent: Oct. 6, 1998

[54] SYSTEM FOR AND METHOD OF INTERACTIVE DIALOG BETWEEN A USER AND A TELEMATIC SERVER

[75] Inventor: Sylvain Morgaine, Paris, France

[73] Assignee: Metalogic, France

[21] Appl. No.: 553,591

[22] PCT Filed: Apr. 12, 1995

[86] PCT No.: PCT/FR95/00476

§ 371 Date: Feb. 26, 1996

§ 102(e) Date: Feb. 26, 1996

[87] PCT Pub. No.: WO95/27934

PCT Pub. Date: Oct. 19, 1995

[30] Foreign Application Priority Data

Apr. 12, 1994 [FR] France .................................. 94 04329

[51] Int. Cl.[6] .................................................. G06F 15/16
[52] U.S. Cl. .............................. 395/200.47; 395/200.49
[58] Field of Search .............................. 348/14, 15, 734; 340/825.72, 825.69; 395/200.47, 200.48, 200.49; 359/148

[56] References Cited

U.S. PATENT DOCUMENTS

4,746,919  5/1988  Reitmeier .......................... 340/825.72
4,855,725  8/1989  Fernandez .................................. 341/23
5,053,758  10/1991  Cornett et al. ........................... 340/706
5,138,649  8/1992  Krisbergh et al. ........................ 379/56
5,204,768  4/1993  Tsakiris et al. .......................... 359/148
5,343,239  8/1994  Lappington et al. ...................... 348/12

*Primary Examiner*—Mehmet B. Geckil
*Attorney, Agent, or Firm*—Larson & Taylor

[57] ABSTRACT

A method and a system for interactive dialogue between a user and a server includes an interactive device including a mechanism for sending data transmitted by the server as infrared signals decoded as hexadecimal character strings and receiving infrared signals. The system further includes a portable remote-control apparatus including a compact housing and a mechanism for receiving and transmitting infrared signals, a mechanism for storing in a read-write memory data corresponding to the signals transmitted by the device and received by the apparatus, a mechanism for displaying messages and a mechanism for manually controlling the transmission of infrared signals sent back. The message display mechanism is capable of displaying in real time and at locations determined by the device the messages derived from control instructions supplied by the device.

13 Claims, 7 Drawing Sheets

SYSTEM FOR AND METHOD OF INTERACTIVE DIALOG BETWEEN A USER AND A TELEMATIC SERVER

BACKGROUND OF THE INVENTION

1. Field of the Invention

The present invention relates to a system for interactive dialog between a user and a telematic server, comprising an interface device which is able to be connected to the server via the telephone network.

It also relates to a method of interactive dialog implementing such a system.

It finds an especially important, although non-exclusive, application in the field of interactive dialogs between a user and a server delivering and/or picking up information consistent with a radiobroadcast or telebroadcast transmission.

2. Description of the Prior Art

Devices are already known for interactive dialog with a server, for example via a telephone handset, or via a modem connected to a microcomputer.

These devices generally require the presence of the user in direct proximity to the connection between the interface device and the network.

Certainly, an apparatus for remote control of the interface device allowing dialog with the server could be provided in order to alleviate this drawback. However, such an arrangement requires special programming of the remote-control apparatus which has to be configured to be able to pick up and retransmit information in accordance with preestablished operating schemes.

This results in great inflexibility of use.

Indeed, even though numerous different functions are programmed into the apparatus, it nevertheless remains true that there is necessarily a finite number of them.

A database storage and interrogation system comprising a microcomputer and a simulated book is likewise known (WO-A-8905023).

The database is stored on a CD ROM disk connected to the computer, the simulated book being linked to the base by infrared radiation and including a liquid crystal display screen which can be contrived to allow preprogrammed touch-control.

Such programming is however carried out beforehand and stored in the ROM memory of the simulated book while the data of the CD are stored in the RAM memory and nowhere is the idea described or suggested of means making it possible to dispatch control command instructions from sender means connected to the CD ROM.

Such a system is therefore limited to the applications for which the simulated book was programmed beforehand.

SUMMARY OF THE INVENTION

The present invention aims to provide a system for and a method of interactive dialog between a user and a telematic server which are better than those previously known at meeting the practical requirements, in particular in that it proposes an interactive dialog between the server and the user together with the display of written or graphic messages on the screen of a portable apparatus which can be actuated by the user, which messages are programmable and reconfigurable in real time, thus enabling a number of an unlimited number of functions to be carried out.

To do this, the invention proposes a remote-control apparatus with no predefined functionality.

It is an external source located wholly remotely from the user, in this instance the server and/or the interface device, which on the one hand, sends the apparatus the functions for processing the data at the same time as the latter, and on the other hand, processes in return the data sent by the user.

The programmability of the display thus permits different screen layouts, adapted to the type of interactivity sought, the real-time reconfiguring of the screens for its part allowing continuous modification of the display as the interaction progresses.

As everything which is storable and processable constitutes a datum, and so as to outline the invention better, in what follows a distinction will be made, when necessary, between the raw data and the control or command instructions, or the functions, for processing the raw data, which are programs.

For the purpose indicated above, the invention therefore essentially proposes a system for interactive dialog between a user and a facility for storing raw data, comprising an interface device able to be connected to the said facility, the said device including:

means for storing and for processing the raw data sent by the facility, means of short-range transmission of infrared signals or radio signals depending on the said raw data sent by the facility and processed by the device, means for receiving infrared signals or radio signals, means for processing the signals received, and means for sending data corresponding to said signals thus processed to the said facility, the system also comprising a portable remote-control apparatus including:

means of short-range reception and transmission of infrared signals or radio signals, means for storing in read/write memory data corresponding to the signals transmitted by the device and received by the apparatus, message display means including a screen, the display means being contrived to represent in real time, at specified locations on the screen, the said data corresponding to the signals transmitted by the device, and means of manual control by the user of the transmission of infrared or radio signals in return, comprising a touch-sensitive plate overlaid on the screen and contrived so as to control the transmission of the said signals in return through pressure on the touch-sensitive plate at specified locations corresponding to the message displayed, wherein the data storage facility belongs to at least one telematic server, the apparatus includes a small-sized box, the signal transmission means of the device are contrived so as to send control instructions to the apparatus, the means for storing in read/write memory of the apparatus being contrived so as to store the control instructions, and the message display means are able to represent in real time, at screen locations specified by the device, the messages emanating from the said control instructions, and from the said data stored in the said read/write memory.

By short range is understood for example a range of less than 20 m, and in particular less than 10 m, or even 5 m.

By small-sized box is understood a box for example oval or parallelipipedal substantially of the same size as a hand, for example 15 cm by 8 cm.

In advantageous embodiments one and/or other of the following provisions are also employed:

the apparatus includes a liquid crystal screen;
the read/write memory is a RAM memory;
the system includes voice interface means;
the signals are infrared signals;
the apparatus also includes means, of the EEPROM type, of permanent storage of functions able to control an interactive reader, a video recorder, a television set, a high-fidelity chain, an electrodomestic appliance or the like.

An interactive reader is for example a reader known by the designations CDI, Photo CD and Video CD, etc.

The invention also proposes a method of interactive dialog between a user and a facility for storing first raw data, in which the first raw data sent by the said facility are stored and processed in an interface device connected to the said facility, and second raw data and/or control instructions coming from the user are sent to the facility in response, characterized in that the facility for storing the first raw data belonging to a server, a portable remote-control apparatus, furnished with a small-sized box which can be actuated by the user, is downloaded remotely from the said device, via infrared radiation or radio waves, by sending to the apparatus the first raw data processed by the device and control instructions for processing the said first raw data processed by the device, messages corresponding to the said first raw data and to the said control instructions are displayed automatically on the apparatus, in real time, or in non-real time via a buffer store in the apparatus, and depending on the said downloaded control instructions, the transmission of infrared or radio signals is commanded manually from the apparatus in response by pressing on locations of the said apparatus which are specified by the device and correspond to the messages displayed, and the said received signals, transmitted from the apparatus, are processed in the device before sending the information corresponding to the signals thus processed to the server.

By the sending at the same time of the first raw data and the control instructions is understood essentially a simultaneous sending, but also a substantially simultaneous sending, that is to say one after the other within a short time, for example of the order of a second.

By automatic display of messages is understood also the automatic addressing or automatic assigning of a specified function to an existing key on a keypad substituted for or adjoined to a message inscription screen.

The invention also proposes a method of interactive dialog between a user and a telematic server, in which the data sent by the server is stored and processed in an interface device connected to the said server, characterized in that short-range infrared signals or radio signals are transmitted from the said device, depending on the data sent by the server and processed by the device, the said data corresponding to raw data and to instructions for using the said raw data, the said transmitted signals are picked up in a portable remote-control apparatus which can be actuated manually by a user, messages corresponding to the said raw data and to the said instructions corresponding to the signals transmitted by the device and received by the apparatus are displayed automatically in real time, or in non-real time via a buffer store in the apparatus, the transmission of infrared or radio signals is commanded manually by pressure on a touch-sensitive plate overlaid on the screen, at locations specified by the device and corresponding to the messages displayed, the signals received are processed in the device.

Advantageously, the method is characterized in that the data and the instructions corresponding to the signals transmitted by the device and received by the apparatus are stored in the said apparatus, in two distinct read/write memories.

The invention will be better understood on reading the description which follows of an embodiment given by way of nonlimiting example.

The description refers to the drawings which accompany it and in which:

DETAILED DESCRIPTION OF THE DRAWINGS

Figure 1:
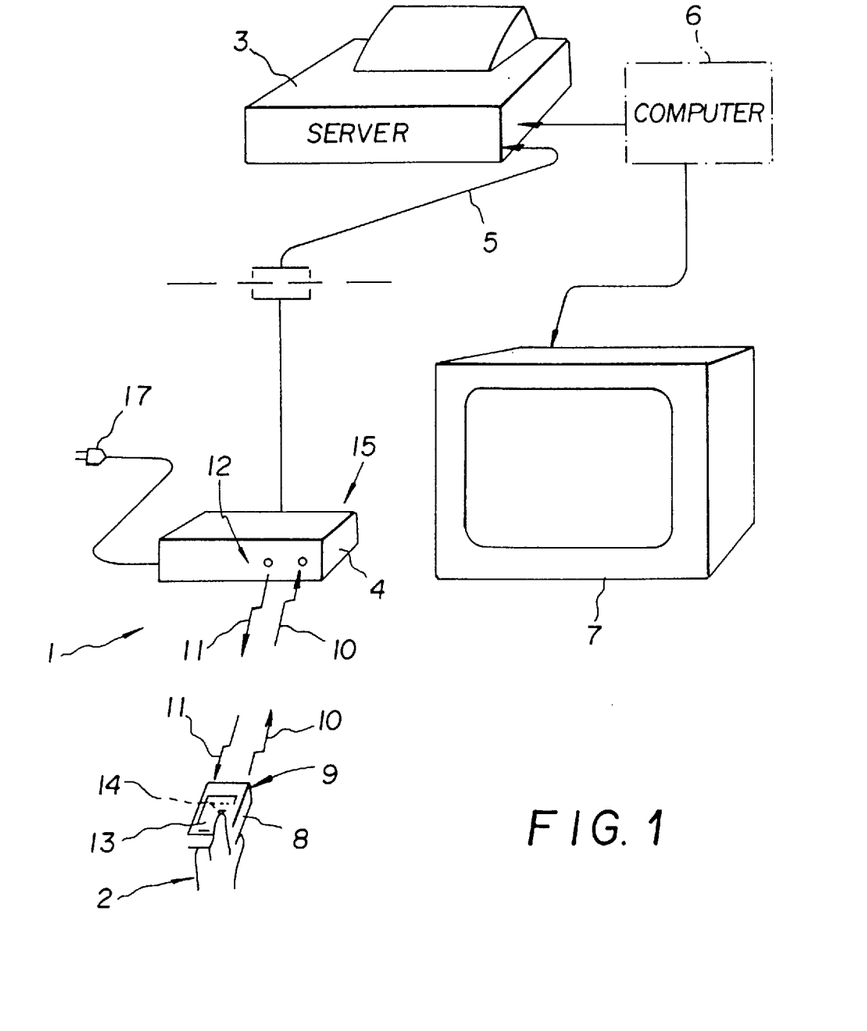
FIG. 1 is a general diagram of a first embodiment of the system according to the invention.

FIG. 1 shows a system 1 for interactive dialog between a user 2 and a telematic server 3.

The system 1 comprises an interface device 4 able to be connected to the server 3 via the telephone network 5.

In the embodiment represented in FIG. 1, the server is itself connected to means 6 which manage an interface in real time with a television transmission sent back to the screen of the television 7 placed facing the user 2.

The system 1 comprises a portable remote-control apparatus 8 including means 9 contrived to transmit and receive infrared radiation, 10 and 11 respectively, for communication with the device 4 accordingly likewise equipped with means 12 for transmitting and receiving infrared radiation.

The remote-control apparatus 8 includes a touch-sensitive plate 13 overlaid on a liquid crystal screen 14 (shown dashed in the figure).

Figure 2:
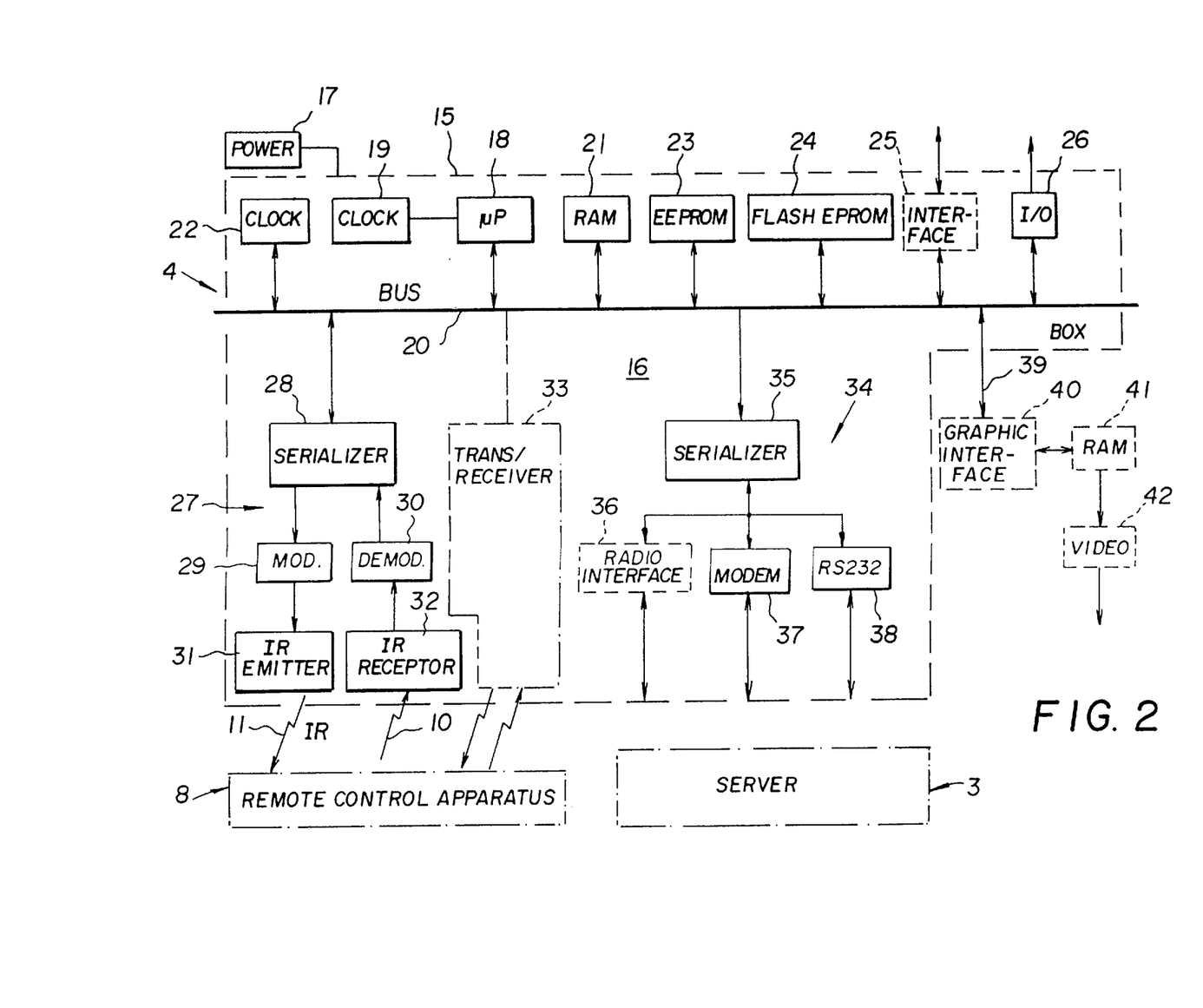
FIG. 2 is a block diagram of the interface device according to one embodiment of the invention.

The system will now be described in detail with reference to FIGS. 2 and 3.

The same reference numerals will be used in the following of the description to designate the same elements as those already indicated.

The device 4 includes a box 15 (shown chain-dotted in FIG. 2) inside which is placed an electronic circuit 16 consisting of one or more electronic boards powered by the means 17.

The electronic circuit 16 includes a microprocessor 18, for example a microprocessor of known type, synchronized by a clock 19.

The microprocessor 18 is moreover linked via a bus 20 (data and control) to a RAM memory 21, for example of 2

Mega-bytes, into are written the data to be transmitted to the remote-control apparatus 8 and the data downloaded from the telematic server.

The circuit 16 includes a scheduling clock 22 contrived to be updated from the server 3 and allowing synchronization with the apparatus 8.

The circuit 16 advantageously comprises, connected to the bus 20, an EEPROM memory 23 for storing preprogrammed instructions, a read/write memory 24, of the RAM, EEPROM, or Flash EPROM type, contrived to store a specified configuration of instructions or operating configuration downloaded from the server.

The circuit 16 advantageously comprises, but in no sense necessarily, an interface circuit 25 for a memory board (shown with a dotted line in FIG. 2) as well as an input/output interface circuit 26 for signalling and for switching on the device.

Means 27 for transmitting and receiving infrared signals are furthermore provided. They are known per se and comprise a so-called serializer/deserializer circuit 28 contrived to manage and decode the signals transmitted and received after the latter have gone respectively gone through a modulator 29 and a demodulator 30, themselves respectively connected to an infrared signals transmitter circuit 31 and an infrared signals receiver circuit 32, the said circuits respectively comprising diodes, namely a diode emitting infrared radiation 11, and an optical receiver sensitive to the infrared radiation 10.

In another embodiment, the device 4 includes means 33 (shown in dotted lines in FIG. 2) for transmitting and receiving short-range radio waves. Here again these means are known per se. They allow dialog with the apparatus 8 then equipped with similar means in a symmetrical manner. These means 33 include in particular a converter circuit interfacing with the microprocessor 18, contrived to process the signals on transmission and on reception.

The device 4 includes a circuit 34 for connection with the telematic network itself linked to the server 3.

The circuit 34 includes a serializer/deserializer circuit 35 (USART) itself connected to a radio interface circuit 36, and/or to a modem 37 interfacing with the ISDN, STN or other telephone network, and to a standard plug 38, of the RS232 or RS422 type, for connection with an external apparatus such as a microcomputer for example.

Lastly, the device 4 includes for example means 39 for connection with a graphics interface circuit 40 linked with screen memory means 41, themselves connected to a video interface circuit 42 known per se.

Figure 3:
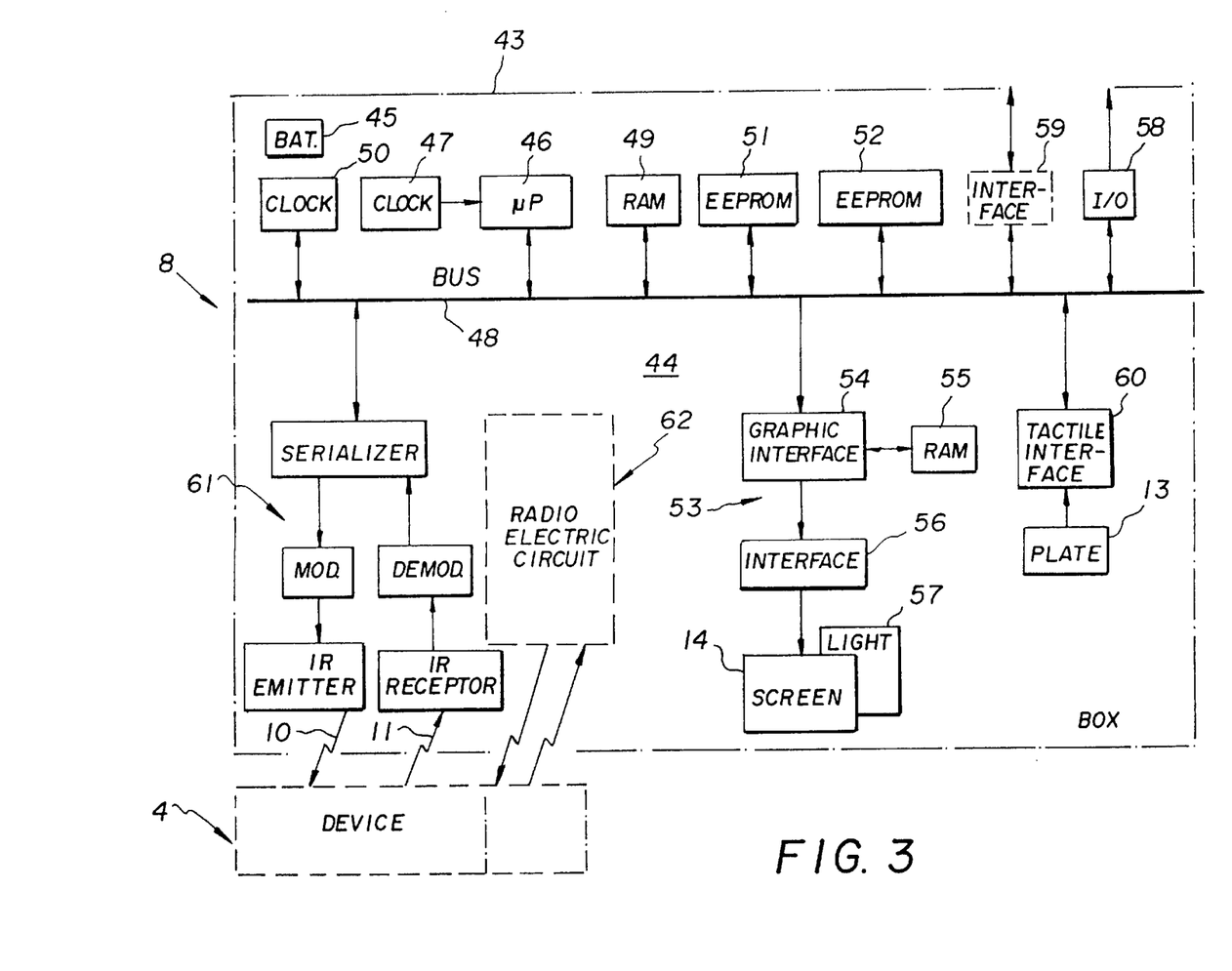
FIG. 3 is a block diagram of the remote-control apparatus according to the embodiment of the invention corresponding to the device of FIG. 2.

FIG. 3 is a block diagram of the remote-control apparatus 8 of FIG. 1.

It includes a portable and ergonomic box 43, for example rectangular and made from plastic.

The box 43 contains an electronic remote-control circuit 44, powered electrically by a battery 45 and comprising a microprocessor 46 sequenced by a clock 47 and connected via a bus 48 to a RAM memory 49 designed to store the data to be transmitted to the device 4 and the data to be retained locally (allowing for example personalization of the apparatus, etc), to a scheduling clock 50 which permits in particular off-line management, and an EEPROM memory 51 for storing instructions for operating the apparatus locally, of the BIOS type, managing for example the operation of the touch-sensitive cells of the touch-sensitive plate.

According to the invention, the circuit likewise comprises a memory 52, of the RAM or EEPROM type, for example of 512 Kbytes, for real-time storage of the data and instructions received from the device, and designed to display the said data in accordance with the configuration of instructions transmitted directly by the device 4, on display means 53.

The means 53 comprise in a manner known per se a circuit 54 for graphical and digital interfacing with screen memory 55 linked to the bus 48 and connected to a circuit 56 for interfacing with the liquid crystal screen 14 furnished with a back-lighting plate 57.

This is for example a screen designed by the U.S. firm Sharp.

In identical manner to the device 4, the apparatus 8 includes, connected to the bus, an input/output circuit 58 (contact switch, indicator lights), and can include, but in no sense necessarily, a circuit 59 for interfacing with a memory board.

According to the invention, the apparatus moreover comprises a touch-sensitive plate 13 placed on the liquid crystal screen and connected to the bus 48 via a touch-sensitive interface circuit 60 known per se.

A touch-sensitive plate which can be used with the invention is for example a plate of the type manufactured by the American company IDT and sold under the reference AXXESS 1001.

Finally, in a symmetrical manner identical to the means 27 and/or 33 of the device, the apparatus comprises means 61 for transmitting and receiving infrared signals, and/or means 62 for transmitting and receiving radio signals, which will therefore not be detailed further on.

Figure 4:
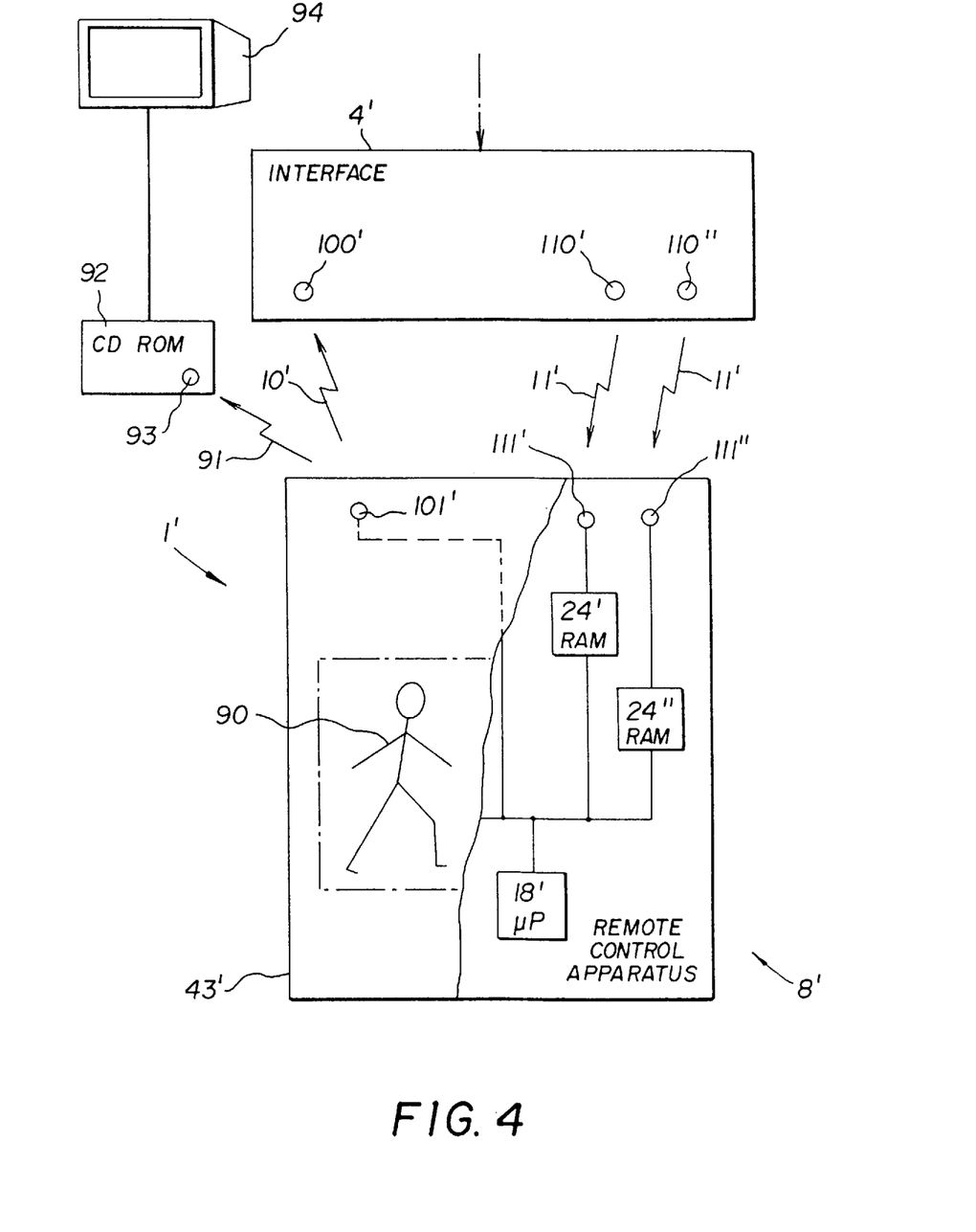
FIG. 4 is a diagram of a second embodiment of the system according to the invention.

FIG. 4 shows another embodiment of a system according to the invention.

Here, to allow real-time or substantially real-time communication between the interface device 4' (connected to the server) and the remote-control apparatus 8', the raw data 11' and the control instructions 11" are sent to the said remote-control apparatus 8' by means of two special-purpose infrared transmitters 110' and 110".

More precisely, there is a first transmitter 110' dedicated to the communication of the raw data (display data) whose speed of transmission is equal to at least 28.8 Kbaud, and a second transmitter 110" dedicated to the communication of the control instructions (program) whose speed is likewise at least 28.8 Kbaud.

Such an arrangement ensures fast and reliable transmission so that the user may make a selection in synchronization.

After demodulating the data dispatched by the server(s), the microprocessor of the interface device 4' sorts and dispatches the raw data 11' to the first transmitter and the control instructions to the second transmitter.

The wavelengths of the two infrared transmitters are different so as to avoid any interference during the simultaneous transmission of the two data streams.

The apparatus 8' actually comprises two optical receivers 111' and 111" which are sensitive to infrared radiation, and each connected to a RAM memory 24', 24" which are independent and linked to the bus 48' which is itself connected to the microprocessor 18', etc, the whole making it possible to exhibit the icon 90 and to send via the emitter diode 101', the infrared signal 10' to the device and its sensor 100', or the infrared signal 91 to an apparatus 92, for example a CD ROM reader, provided with a sensor 93.

Here again the apparatus can be connected to the television set 94, a remote control of this type making it possible for example to enable a video program prerecorded on a CD ROM disk transmitted previously to the user, upon instructions given at a time specified by the server.

The parallel mode of transmission does not absolutely have to separate the display signals from the control instructions.

Indeed, it is conceivable that in order to accelerate the downloading of a program, both transmitters are used.

Likewise, certain applications may require a faster display speed made possible by the parallel use of the transmitters.

Figure 5:
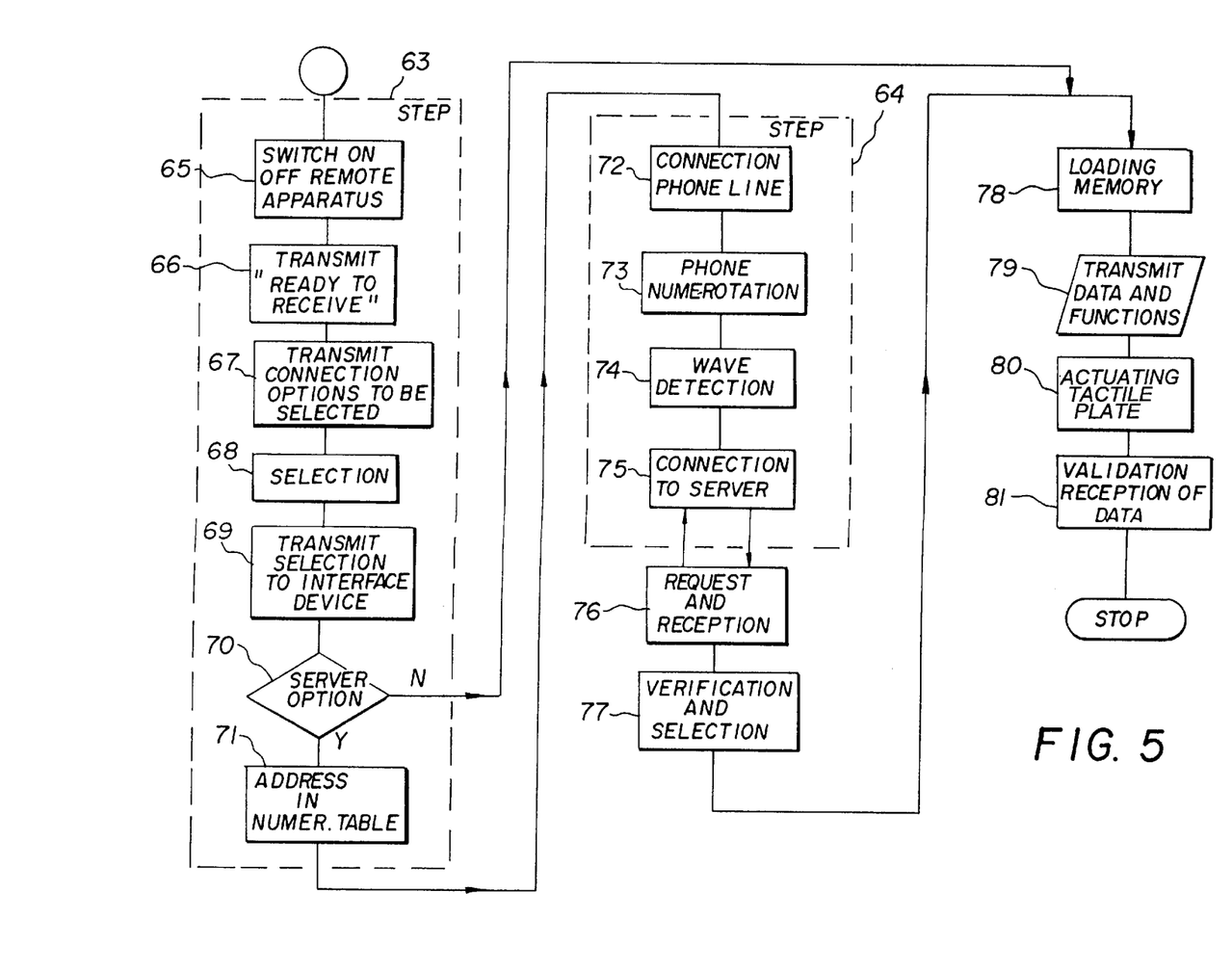
FIG. 5 is a simplified flowchart of the communication protocol between the interface device and the remote-control apparatus, according to the embodiment of the invention more particularly described here.

FIG. 5 is a simplified flowchart giving the principal steps of the protocol for connecting the device 4 and the apparatus 8 according to the embodiment of the invention which is more particularly described here.

It includes a first step 63 termed the remote control data request step, a second step 64 termed the modem 37 actuation step, and the dialog steps proper.

The first two steps 63 and 64 (shown dashed in FIG. 4 [sic]) comprise the following sub-steps.

Step 63 (Remote control data request):
(65): Activation of the remote-control.
(66): Dispatching of the "READY TO RECEIVE" code to the interface device 4.
If after 2 seconds the device 4 does not respond, then the remote control displays for example a send error message.
(67): Dispatching of the options for connection to the apparatus of the remote control 8.
(68): Selection of a connection option on the apparatus of the remote-control 8.
(69): Dispatching of the option to the interface device 4.
(70): Selection of the server option, that is to say connection or non-connection to a modem circuit 37. If the response is no the remote control remains in local mode and goes directly to step (78).
(71): Addressing in the numbering table (see below).
Step 64 (Actuation of the modem):
(72): Seizing of the telephone line.
(73): Dialling of the telephone number.
(74): Detection of the carrier frequency.
(75): Connection of the device 4 to the server 3.

The steps of interactive dialog between the user and the server are performed next.

These are the following steps:
(76): Request and reception of data between the device 4 and the server 3.
(77): Checking and sorting of the data. (78): Loading and coding of the data into memory 23 and 24 of the device 4.
(79): Dispatch to the remote-control apparatus 8 of the display codes, the position of the messages on the screen and the programming parameters.
(80): Actuation by the user of the touch-sensitive screen.
(81): Dispatch to the device of the code for confirming reception of the data.

The protocol for communication according to the embodiment of the invention which is more particularly described here will now be detailed below. It is given in a non-limiting manner.

As has been seen, the device 4 receives information from a remote site via a built-in modem. This information can be downloaded, in a programmed manner or else on request by the user via the remote control.

To do this, 4 tables are created in the memories 23 and 24 of the device 4:
1 coding table (Table 1)
1 programming table (Table 2)
1 numbering table (Table 3)
1 so-called logon scripts table (Table 4).

The coding table within the device (4) is similar to the display table within the remote-control apparatus.

The purpose of this table is to translate the characters originating from the server located on a remote site into their tabular coordinates.

For example, if the character "I" is read, it is translated into 12, "J" into 22, etc.

TABLE 1

|   | 1 | 2 | 3 | 4 | 5 | 6 | 7 | 8 |
|---|---|---|---|---|---|---|---|---|
| 1 | A | B | C | D | E | F | G | H |
| 2 | I | J | K | L | M | N | O | P |
| 3 | Q | R | S | T | U | V | W | X |
| 4 | Y | Z | a | b | c | d | e | f |
| 5 | g | h | i | j | k | l | m | n |
| 6 | o | p | q | r | s | t | u | v |
| 7 | w | x | y | z | 0 | 1 | 2 | 3 |
| 8 | 4 | 5 | 6 | 7 | 8 | 9 | . | : |
| 9 | , | ? | ■ |   | + | * | - | / |

The programming table (Table 2) tells the device 4 which actions are to be performed when the user has selected an information item on the touch-sensitive plate of the remote-control apparatus.

This table is composed of three columns. According to the invention, it is dynamic, that is to say it fills and empties as a function of the information communicated to and from the remote-control apparatus.

The 1st column gives the X, Y position of that cell of the touch-sensitive screen selected by the user.

The 2nd column gives the code for operating the device, or action code.

The action code may for example have several values:
"3": The action is local between the device 4 and the remote control;
"4": the action is transmitted to the information server via a telephone network.

The 3rd column defines the action to be performed.

This action is for example defined by a code of 2 letters corresponding to the various functions to be executed.

Using the following symbolic representation:
<...>: compulsory parameters
(<...>): optional parameters provision is made for example for the following functions:

"SR" <character string>, <remote-control action code>, (<x,y>) dispatching of a character string to the remote-control apparatus 8

"CX" <name of the remote server> modem connection to the server

"SD" <character string> dispatching of a character string to the remotely located server 3

"RD" reception of a character string from the server 3

"CL" (<x1 y1 y2 y2>)

total or partial erasure of the display area on the remote-control apparatus; total or indexed deletion from the command table etc . . . .

Table 2 therefore takes the following form:

TABLE 2

| POSITION | BOX ACTION CODE | ACTION |
|---|---|---|
| 10 20 | 3 | SR("CONFIRM",1,40,30) |
| 40 30 | 4 | RD |
| 110 30 | 4 | SD "OK" |
| 130 130 | 3 | CL |
| ... | ... | ... |

A more precise description of the actions or functions SR, CL, SD and RD is given below.

SR (Send Remote) function

This consists in codifying the character string via the coding table e.g.: "CONFIRM"=> "63 11 42 12 41 51 23"

To do this, the function SR performs the following operations:

builds the command to be dispatched to the remote-control apparatus e.g.: "CONFIRM",1,40,30"
=> "10 1 40 30 63 11 12 12 41 51 23"

dispatches the command adds the corresponding entry to the programming table.

CX (Connect) function

In this function the so-called script program is executed for logging on to the network server, via the numbering table (Table 3), which will be described later.

e.g.: CX "minitel"

SD (Send Data) function

This allows the character string to be dispatched and is followed by a carriage return.

e.g.: "OK" <cr>

RD (Receive Data) function

This function allows reception of a character string.

e.g.: "DO YOU WISH TO CONTINUE?"

Moreover this codifies the character string via the coding table (Table 1).

The numbering table (Table 3) will now be described. It tells the device 4 which communication parameters are to be used and which script is to be executed from the table of logon scripts (Table 4below).

Table 3 is composed of 8 columns, namely:

column 1: name of the server columns 2 to 3: composition of the connect number columns 4 to 8: communication parameters

TABLE 3

| NAME OF THE SERVER | prefix | TEL NUMBER | baud | bits | par | stop | script |
|---|---|---|---|---|---|---|---|
| minitel | — | 11 | 1200 | 7 | 0 | 1 | 1 |
| ... | ... | ... | | | | | |

The table of logon scripts actually makes it possible to execute a series of commands in order to automate the logon procedure.

TABLE 4

| SCRIPT NUMBER | SCRIPT NUMBER |
|---|---|
| 1 | 2 |
| pause 10 | |
| SD "SERVICE" | |
| pause 5 | |
| SD "4357523" | |

In order to talk to one another in the embodiment more particularly described here, the device and the apparatus use a protocol for coding the infrared signals. The protocol used to send the data is of known type.

Moreover, a protocol used to send the control instructions according to the embodiment of the invention more particularly described, is given below.

Protocol for coding the infrared signals corresponding to the control instructions:

The infrared signals are for example coded in hexadecimal.

The character string sent from the device for interfacing with the server of the remote-control apparatus is then structured into several parts:

The first byte defines the total length of the character string;

the second byte defines the type of infrared data to be transmitted;

"1": transmission of a device control instruction

"2": transmission of an off-device infrared code.

By "device control instruction" is understood the codifying of the commands dispatched by the device to the remote-control apparatus which in the case of an interactive request may themselves be returned to the device when the user selects the corresponding touch-sensitive area.

By "off-device infrared code" is understood the codifying of an infrared signal dispatched by the device to the remote-control apparatus which will itself be returned to the domestic appliance capable of interpreting it (interactive reader, video recorder, TV, etc.).

In the case of device control instructions, the succeeding bytes are for example coded as follows:

The third byte determines the index in the command table (Table 6):

The fourth byte determines the remote-control action code (Table 6);

In the case of a "1" action code the four succeeding bytes define the extent of the associated touch-sensitive area (Table 7) and the remaining bytes determine the command sent (Table 6).

In the case of off-device infrared codes, the succeeding bytes are themselves, for example, coded as follows:

The third byte determines the index in the command table (Table 6);

The fourth byte determines the remote-control action code (Table 6);

The action code is equal to "2";

The fifth byte defines the length of the character string; the succeeding bytes define the infrared signal (IR).

The bytes defining the IR signal are moreover coded as follows:

The first group of 4 bits determines the number of IR pulses to be transmitted per spacing of N milliseconds, N varying depending on the type of remote control to be emulated.

The second group of 4 bits determines the latency time between the byte in question and the next byte. These have a spacing of M milliseconds. N may or may not be equal to M.

An example is given below:

Such an arrangement implies that there are two pulses of 0.4 ms and a wait of 2*4 ms before the byte "34", etc.

The remote-control apparatus 8 and its operation will now be described more precisely.

Three tables are downloaded into the memory of the remote-control apparatus, namely:

1 display table (Table 5)
1 command table (Table 6)
1 programming table (Table 7)

The display table (Table 5) is identical to the coding table (Table 1) of the device 4. In the example described here, it is therefore a matrix with 9 rows and 8 columns, indexed from 1 to 9 and from 1 to 8 respectively. Inside this matrix are the various display characters available (for example: entry 11 contains the character "A", entry 21 contains the character "B", etc . . . ).

TABLE 5

|   | 1 | 2 | 3 | 4 | 5 | 6 | 7 | 8 |
|---|---|---|---|---|---|---|---|---|
| 1 | A | B | C | D | E | F | G | H |
| 2 | I | J | K | L | M | N | O | P |
| 3 | Q | R | S | T | U |   | W | X |
| 4 | Y | Z | a | b | c | d | e | f |
| 5 | g | h | i | j | k | l | m | n |
| 6 | o | p | q | r | s | t | u | v |
| 7 | w | x | y | z | 0 | 1 | 2 | 3 |
| 8 | 4 | 5 | 6 | 7 | 8 | 9 | . | : |
| 9 | , | ? | ■ |   | + | * | - | / |

The command table (Table 6) is itself composed of 3 columns.

The 1st column gives the index which represents the number of the command.

The 2nd column specifies the action code for the remote-control apparatus.

The action code indicates the type of command involved.

Here, the action code may have several values:

"0": No command transmitted by the remote-control apparatus
"1": Transmission of the coordinates (x,y) of the selection
"2": Transmission of a local infrared signal etc . . . .

The 3rd column gives the command transmitted from the remote-control apparatus 8 to the device 4 or to a local device which can be remotely controlled by infrared.

TABLE 6

| INDEX | REMOTE-CONTROL ACTION CODE | COMMAND TRANSMITTED |
|---|---|---|
| 1 | 0 | — |
| 2 | 1 | 10 20 |
| 3 | 2 | 8 22 44 OB 44 22 32 18 64 |
| . . . | . . . | . . . |

Finally, the programming table (Table 7) associates the selection of an area of the screen with its corresponding command index. The selection area is determined by the start and end numbers of the touch-sensitive cells on the screen.

For example: 01030303 1 means that, if the user presses any touch-sensitive cell between cell 0103 and cell 0303 then row No. 1 of the command table will be executed.

TABLE 7

| TOUCH-SENSITIVE CELLS | COMMAND TABLE INDEX |
|---|---|
| 01030303 | 1 |
| 01040304 | 2 |
| . . . | . . . |

An exemplary application will now be described with reference to FIGS. 5a to 5f.

According to the invention, the display of the screen of the remote-control apparatus is programmed by the device 4 which dispatches signals to the remote-control apparatus, corresponding on the one hand to the data defining the contents of the display, and on the other hand to the data specifying the coordinates (X, Y) of the display area on the screen.

For example, during the progress of a telematic action, it is desired to be able to show which choices are offered to the user.

Let us recall that with the invention, the corresponding data [sic] to the functionality attached to a touch-sensitive area are also sent in real or equivalent time to the remote-control apparatus 8.

When the user touches the part of the touch-sensitive screen displaying a possible choice, this selection is then sent to the external device in order to be interpreted.

In the embodiment more particularly described here, the functionalities attached to the display are for example of two kinds: on the one hand, those which correspond in a manner known per se to infrared signals which make it possible to control, among other things, the various domestic appliances (interactive readers, TV, video recorder, Hi-Fi chain, home automation, etc) and on the other hand, those which relate to programs allowing interactivity with the server.

An exemplary configuration of the remote-control apparatus is described below with reference to FIGS. 6a to 6f.

Figure 6A:
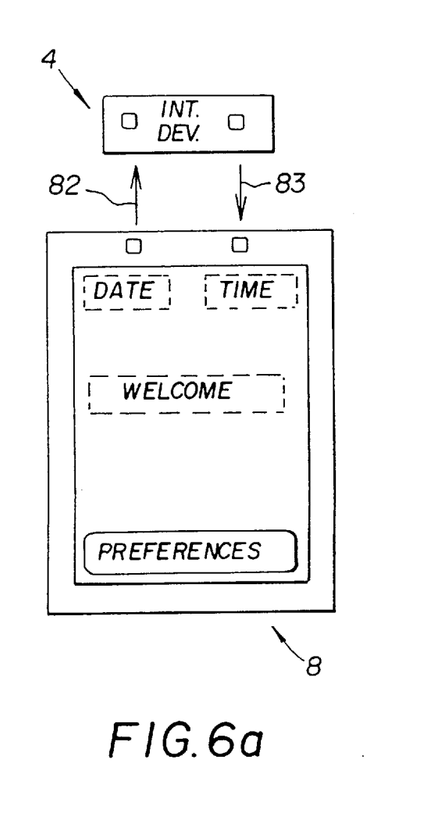
FIGS. 6a to 6f show diagrammatically an example of the operation of the system according to the invention.

On turning on the remote-control apparatus 8, the latter transmits a wake-up signal 82 to the device 4 which will in turn transmit initialization data 83 such as the date, time, a welcoming character string and the characters "PREFERENCES" (FIG. 6a).

Figure 6B:
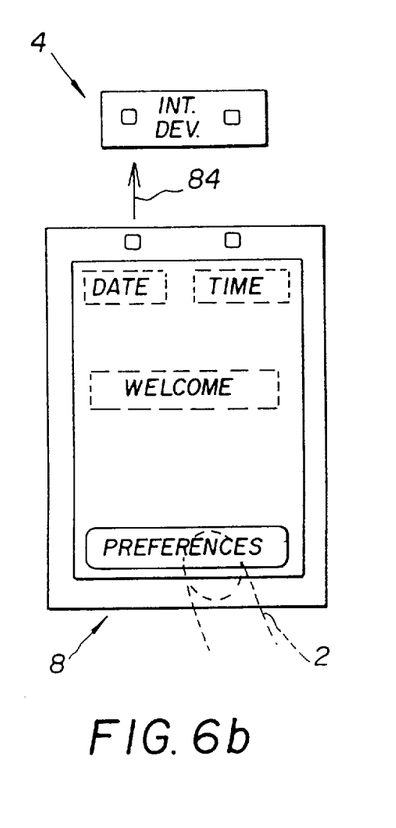
Figure 6C:
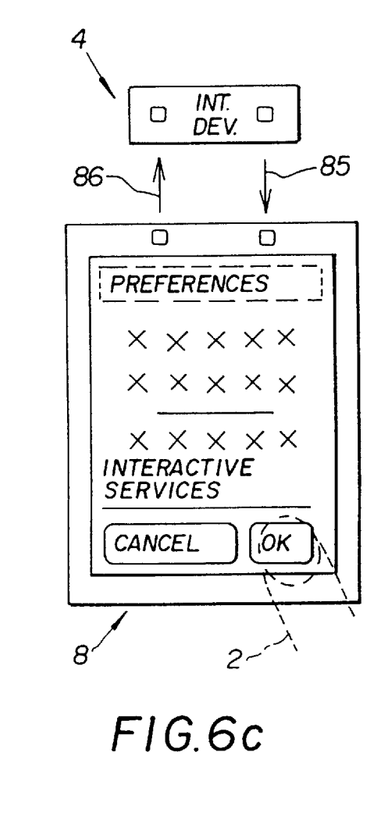
Figure 6D:
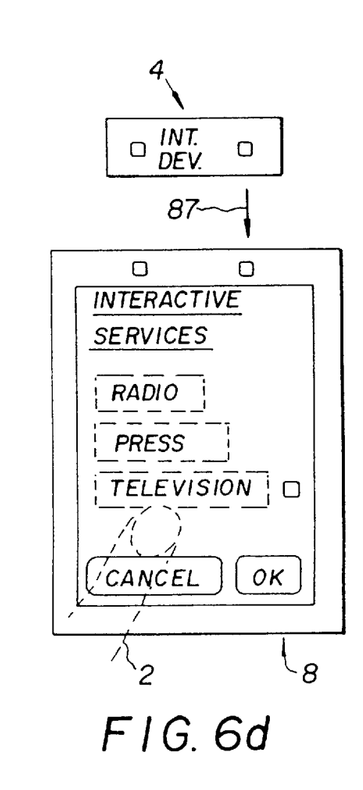
Figure 6E:
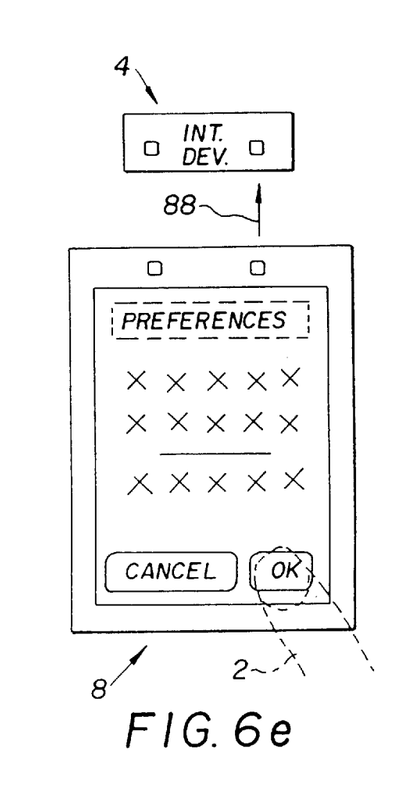

The user 2 then presses "PREFERENCES", which transmits a signal 84 to the device (FIG. 6b).

The device then transmits (see FIG. 6c) (arrow 85) the PREFERENCES screen together, for example, with the "DATE", "TIME", etc. characters as well as the turn-on configuration preferences stored in memory in the apparatus. To select or deselect a preference it then suffices for the user to press the character string of his choice (arrow 86).

The user having for example chosen "INTERACTIVE SERVICES", the device (see FIG. 6d) transmits (arrow 87) the list of available interactive services. The "TELEVISION" service is selected in turn.

Figure 6F:
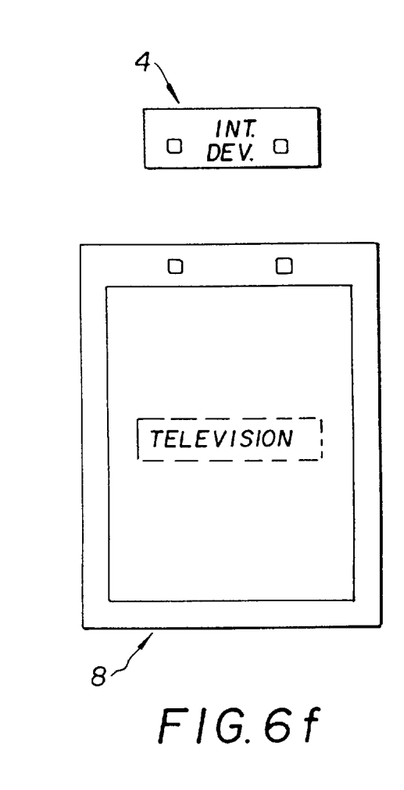

The user confirms this choice (FIG. 6e) by pressing "OK" (arrow 88) and returns to the PREFERENCES screen; the configuration operation is finished and he can now press "OK" again in order to pass to interactive mode of command with the server (FIG. 6f).

Advantageously, and as and when the display and the instructions relating to the functions to be undertaken by the touch-sensitive areas are sent from the device to the remote-control apparatus, the latter places them in its EEPROM memory 51. This makes it possible to minimize interaction with the box with a view to the configuring of other preferences. As has been seen, other flat screen technologies such as liquid crystal screens can also be used.

I claim:

1. An interactive user interface system for accessing raw data from a telematic server connected to an outside telephone network, and addressing processed data in return to said server in relation with a broadcasting system, said interactive user interface system comprising:

a device arranged to be connected to said telephone network, said device including:
(a) means for storing and for processing the raw data into separate graphical information and command instructions,
(b) means for encoding said separate graphical information and command instructions into infra-red or radio first signals coded as hexadecimal character strings and for transmitting simultaneously said first signals corresponding to said graphical information and command instructions to a portable remote control apparatus,
(c) means for receiving and decoding infra-red or radio second signals emitted from said portable remote control apparatus, and
(d) means for processing said second signals into third signals and addressing said third signals to the telematic server; and said portable remote control apparatus including:
(a) means for receiving and decoding the infra-red or radio first signals emitted from said device into said separate graphical information and command instructions,
(b) means for storing in a read/write memory said separate graphical information and command instructions,
(c) means for configuring said remote control apparatus in view of said command instructions, said means for configuring comprising message display means including a screen comprising a touch-sensitive plate arranged for displaying in real time graphics corresponding to said graphical information according to said command instructions at specified locations on the screen, said graphics being activated through pressure on said touch-sensitive plate by the user for delivering fourth signals corresponding to said command instructions, and
(d) means for encoding said fourth signals into infra-red or radio second signals and transmitting said second signals to the device.

2. System according to claim 1, wherein the screen is a liquid crystal screen.

3. System according to claim 1, wherein the read/write memory is a RAM memory.

4. System according to claim 1, further including a voice interface means.

5. System according to claim 1, wherein said device further comprises two infrared signals emitters arranged for emitting graphical information and instruction commands simultaneously.

6. System according to claim 1, wherein the apparatus also includes means of permanent storages of command instructions, able to control an interactive reader, a video recorder, a television set, a high fidelity chain, or an electrodomestic appliance.

7. A remote control system for downloading and processing raw data from a telematic server connected to an outside telephone network, and controlling a domestic device such as a videorecorder, a TV set, a high fidelity stereo system or a home appliance, said remote control system comprising:

a device arranged to be connected to said telephone network, said device including:
(a) means for storing and for processing the raw data into separate graphical information and command instructions,
(b) means for encoding said separate graphical information and command instructions into infra-red or radio first signals coded as hexadecimal character strings and for transmitting simultaneously said first signals corresponding to said graphical information and command instructions to a portable remote control apparatus,
(c) means for receiving and decoding infra-red or radio second signals emitted from said portable remote control apparatus, and
(d) means for storing and processing said second signals into third signals and addressing said third signals, to the telematic server; and said portable remote control apparatus including:
(a) means for receiving and decoding the infra-red or radio first signals emitted from said device into said separate graphical information and command instructions,
(b) means for storing in a read/write memory said separate graphical information and command instructions,
(c) means for configuring said remote control apparatus in view of said command instructions, said means for configuring comprising message display means including a screen comprising a touch-sensitive plate arranged for displaying in real time graphics corresponding to said graphical information according to said command instructions at specified locations on the screen, said graphics being activated through pressure on said touch-sensitive plate by the user for delivering fourth signals corresponding to said command instructions, and means for encoding said fourth signals into said infra-red or radio fifth signals and transmitting said fifth signals for controlling said domestic device.

8. A method of interactive use for accessing raw data from a telematic server connected to an outside telephone network, and addressing processed data in return to said server in relation with a broadcasting system, said method comprising the steps of:

connecting a device to said telephone network via a modem, storing and processing the raw data into separate graphical information and command instructions, encoding said graphical information and command instructions into infra-red or radio first signals transmitted as hexadecimal character strings, transmitting said first signals to a portable remote control apparatus, receiving and decoding the infra-red or radio first signals emitted from said device into said separate graphical information and command instructions in said portable remote control apparatus, storing in a read/write memory said separate graphical information and command instructions, displaying in real time graphics corresponding to said graphical information according to said command instructions at specified locations on a screen comprising a touch-sensitive plate, activating said graphics through pressure on said touch-sensitive plate by the user for delivering fourth signals corresponding to said command instructions, encoding said fourth signals into said infra-red or radio second signals, transmitting said second signals to the device, receiving and decoding in said device said second signals emitted from said portable remote control apparatus, and addressing said second signals to the telematic server.

9. Method according to claim 8, further comprising the steps of processing the second signals, within the device into third signals and addressing said third signals to the telematic server.

10. Method according to claim 8, further comprising the step of manually controlling with the apparatus an interactive reader, a video recorder, a television set, a high-fidelity chain, or an electrodomestic appliance.

11. Method of interactive dialog according to claim 8, wherein the manual command of the transmission of infra-red or radio signals is effected via a touch-sensitive plate overlaid on the screen and contrived so as to control the transmission of the signals by pressure on said touch-sensitive plate at locations specified by the device and corresponding to the messages displayed.

12. Method according to claim 8, wherein the first signals transmitted by the device and received by the apparatus, corresponding to graphical information and instruction commands, are stored in said apparatus, in two distinct read/write memories.

13. A method for downloading and processing raw data from a telematic server connected to an outside telephone network, and controlling a domestic device such as a videorecorder, a TV set, a high fidelity stereo system or a home appliance, said method comprising the steps of:

connecting a device to said telephone network via a modem, storing and processing the raw data into separate graphical information and command instructions, encoding said separate graphical information and command instructions into infra-red or radio first signals coded as hexadecimal character strings, transmitting said first signals to a portable remote control apparatus, receiving and decoding the infra-red or radio first signals emitted from said device into said graphical information and command instructions in said portable remote control apparatus, storing in a read/write memory said graphical information and command instructions, displaying in real time graphics corresponding to said graphical information according to said command instructions at specified locations on a screen comprising a touch-sensitive plate, activating said graphics through pressure on said touch-sensitive plate by the user for delivering fourth signals corresponding to said command instructions, encoding said fourth signals into infra-red or radio fifth signals, and transmitting said fifth signals for controlling said domestic device.

* * * * *